United States Patent
Bragg (10) Patent No.: US 8,948,055 B2
(45) Date of Patent: Feb. 3, 2015

(54) RESILIENT INTERWORKING OF SHORTEST PATH BRIDGING AND ETHERNET VIRTUAL PRIVATE NETWORKS

(71) Applicant: Ciena Corporation, Hanover, MD (US)

(72) Inventor: Nigel Lawrence Bragg, Cambridge (GB)

(73) Assignee: Ciena Corporation, Hanover, MD (US)

(*) Notice: Subject to any disclaimer, the term of this patent is extended or adjusted under 35 U.S.C. 154(b) by 137 days.

(21) Appl. No.: 13/667,158

(22) Filed: Nov. 2, 2012

(65) Prior Publication Data

US 2014/0126422 A1    May 8, 2014

(51) Int. Cl.
*H04L 12/28* (2006.01)

(52) U.S. Cl.
USPC .......................................... 370/255

(58) Field of Classification Search
CPC ......... H04L 45/02; H04L 41/12; H04L 12/66; H04L 12/56; H04L 29/0653; H04L 29/06163; H04L 29/06068
USPC ......... 370/255, 254, 256, 400, 401, 390, 389, 370/392, 465, 466, 467, 242
See application file for complete search history.

(56) References Cited

U.S. PATENT DOCUMENTS

| | | | |
|---|---|---|---|
| 7,463,584 B2 | 12/2008 | Allan et al. | |
| 7,688,756 B2 | 3/2010 | Allan et al. | |
| 7,894,450 B2 | 2/2011 | Unbehagen et al. | |
| 8,059,647 B2 | 11/2011 | Ashwood-Smith et al. | |
| 8,194,668 B2 | 6/2012 | Friskney et al. | |
| 2005/0220096 A1 | 10/2005 | Friskney et al. | |
| 2006/0029087 A1* | 2/2006 | Ooi | 370/402 |
| 2007/0076719 A1 | 4/2007 | Allan et al. | |
| 2008/0172497 A1 | 7/2008 | Mohan et al. | |
| 2008/0279196 A1 | 11/2008 | Friskney et al. | |
| 2009/0201937 A1 | 8/2009 | Bragg et al. | |
| 2010/0157844 A1 | 6/2010 | Casey et al. | |
| 2011/0103263 A1 | 5/2011 | Unbehagen et al. | |
| 2011/0116385 A1* | 5/2011 | Turlington et al. | 370/242 |
| 2012/0039161 A1 | 2/2012 | Allan et al. | |
| 2012/0063451 A1 | 3/2012 | Keesara et al. | |
| 2012/0134357 A1 | 5/2012 | Ashwood Smith et al. | |
| 2012/0195319 A1 | 8/2012 | Bragg et al. | |

OTHER PUBLICATIONS

Dave Allan, Jeff Tantsura (Ericsson), Don Fedyk (Alcatel-Lucent), Ali Sajassi (Cisco); "802.1aq and 802.1Qbp Support over EVPN draft-allan-12vpn-spbm-evpn-02" L2VPN Working Group; Internet Draft, Allan et al., Expires Apr. 2013.

(Continued)

*Primary Examiner* — Chi H Pham
*Assistant Examiner* — Alexander O Boakye
(74) *Attorney, Agent, or Firm* — Clements Bernard PLLC; Christopher L. Bernard; Lawrence A. Baratta, Jr.

(57) ABSTRACT

An Ethernet network, an Ethernet method, and an Ethernet node provide active-active dual-homed interworking between two Ethernet networks. The network, method, and node can include two nodes interconnected each to a Shortest Path Bridging (SPB) network and an Ethernet Virtual Private Network (E-VPN). The two nodes can utilize a same Ethernet Segment Identifier (ESI) for the E-VPN network to cause the dual-homed links to appear as a single link from an E-VPN perspective and a dummy node to advertise an extra node in the SPB network enabling two paths therein.

17 Claims, 5 Drawing Sheets

(56) References Cited

OTHER PUBLICATIONS

Network Working Group; N. Bitar (Verizon), S. Boutros, K. Patel, S. Salam (Cisco), J. Drake, R. Shekhar (Juniper Networks), A. Sajassi (Cisco), R. Aggarwal (Arktan), W. Hendrickx, F. Balus (Alcatel-Lucent), Aldrin Isaac (Bloomberg), J. Uttaro (AT&T); "BGP MPLS Based Ethernet VPN—draft-ietf-l2vpn-evpn-02"; Internet-Draft; Copyright (C) 2012 IETF Trust and the persons identified as the document authors. Sajassi, Aggarwal et al. Expires Apr. 22, 2013.

Internet Working Group; Florin Balus, Wim Henderickx (Alcatel-Lucent), Clarence Filsfils, Dennis Cai (Cisco), Ali Sajassi, Samer Salam, Sami Boutros (Cisco), Nabil Bitar (Verizon), Aldrin Isaac (Bloomberg), Lizhong Jin (ZTE); "PBB EVPN draft-ietf-l2vpn-pbb-evpn-03"; Copyright (C) 2012 IETF Trust and the persons identified as the documents authors. Sajassi et al. Expires Dec. 20, 2012.

David Allan (Ericsson), Peter Ashwood-Smith (Huawei), Nigel Bragg (Ciena), Janos Farkas (Ericsson), Don Fedyk (Alcatel-Lucent), Michel Ouellete (Huawei), Mick Seaman (Consultant), Paul Unbehagen (Alcatel-Lucent); Carrier Scale Ethernet—Article "Shortest Path Bridging: Efficient Control of Largest Ethernet Networks"; (C) 2010 IEEE—IEEE Communications Magazine—Oct. 2010.

* cited by examiner

RESILIENT INTERWORKING OF SHORTEST PATH BRIDGING AND ETHERNET VIRTUAL PRIVATE NETWORKS

FIELD OF THE INVENTION

Generally, the field of art of the present disclosure pertains to networking systems and methods, and more particularly, to Active-Active resilient interworking of Shortest Path Bridging (SPB) and Ethernet Virtual Private Networks (E-VPNs).

BACKGROUND OF THE INVENTION

Redundant Ethernet networking has traditionally been limited, by its absolute requirement for loop avoidance, to the use of a simple spanning tree, which results in the blocking of all except one path between endpoints. Recent application of Link-state routing to Ethernet (e.g., in SPB and E-VPN) have allowed this spanning tree requirement, and its undesirable blocking consequences, to be mitigated, but only within a single network domain controlled by a single protocol. For example, SPB Media Access Control (MAC) bridging (SPBM), defined in IEEE 802.1aq-2012, the contents of which are incorporated by reference herein, describes the IEEE link-state routing solution for Ethernet MAC-in-MAC, with all paths within an SPBM domain unblocked. SPBM is a native Ethernet link-state technology. E-VPN is an emerging IETF technology for Ethernet emulation over Multiprotocol Label Switching (MPLS). An E-VPN includes Customer Edges (CEs) that are connected to Provider Edges (PEs) that form the edge of the MPLS infrastructure. A CE may be a host, a router or a switch. The PEs, also known as MPLS edge switches (MES) in E-VPN documentation, provide virtual Layer 2 bridged connectivity between the CEs. There may be multiple E-VPNs in a provider's network.

EVPN is the likely successor to VPLS for delivery of Carrier Ethernet services due to significant improvements over VPLS. For example, EVPN is described inter alia in various Layer 2 Virtual Private Network Working Group drafts such as draft-ietf-12vpn-evpn-01 entitled "BGP MPLS Based Ethernet VPN" (July, 2012), draft-ietf-12vpn-pbb-evpn-03 entitled "PBB-EVPN" (June, 2012), and draft-allan-12vpn-spbm-evpn-01 entitled "802.1aq and 802.1Qbp Support over EVPN" (July 2012), the contents of each are incorporated by reference herein. The document draft-ietf-12vpn-evpn-01 describes a technique emerging from the IETF to carry Ethernet over MPLS and also describes inter alia how to dual-home a single MAC-in-MAC CE (running IEEE Link Aggregation Group (LAG)) with multiple E-VPN PEs whilst achieving active-active operation. The draft draft-ietf-12vpn-pbb-even-03 describes how the scaling problems of E-VPN can be mitigated by "front-ending" that technology by a MAC-in-MAC Ethernet technology, such as Provider Backbone Bridging (PBB) or SPBM. However, there is no specification of active-active operation with multiple redundant CEs. For network-network interworking, draft-ietf-12vpn-pbb-evpn-03 and draft-allan-12vpn-spbm-evpn-01 both describe variations of a technique in which a MES forming one of a number of gateways to a MAC-in-MAC island may be elected as the single Designated Forwarder for a subset of the Ethernet services, which can be used to spread services between gateways. This has the disadvantages that load spreading is suboptimal with small numbers of large services, and that failure of a gateway node requires reassignment and re-announcement of service-to-gateway bindings which will severely impact restoration times.

A technique has not yet been identified for the achievement of fully link- and node-redundant interworking without service awareness between SPBM and E-VPN whilst maintaining active-active operation. This is an important aspect for Ethernet service delivery. In particular, on the interface between a customer or service provider edge SPBM network and a service provider core E-VPN network, there is a need for redundant connectivity (for resiliency), and a strong desire for "active-active" operation with excellent load sharing (so that no bandwidth is stranded).

BRIEF SUMMARY OF THE INVENTION

In various exemplary embodiments, systems and methods include various techniques to allow SPBM (the native Ethernet Link-state technology) to interwork with E-VPN (an emerging IETF technology for Ethernet emulation over MPLS) in such a way that an interface using both multiple links and multiple redundant nodes between networks using these technologies may be unblocked and fully utilized. In particular, active-active interworking systems and methods enable SPBM to interwork with E-VPN in a fully utilized and unblocked manner without per-service filtering. Specifically, active-active interworking is the "holy grail" and extremely difficult in the Ethernet context. The systems and methods offer such techniques to allow SPBM to overlay E-VPN. For example, the systems and methods contemplate active-active interface operation using both multiple links and multiple redundant nodes between networks using SPBM and E-VPN. That is, the systems and methods contemplate both a link- and node-diverse set of SPBM and E-VPN interfaces so that all links forming that interface are used for traffic carrying for every individual service being carried between the networks.

In an exemplary embodiment, an Ethernet network includes a first Ethernet node connected to both a first Ethernet network operating a first protocol and a second Ethernet network operating a second protocol; a second Ethernet node connected to both the first Ethernet network and the second Ethernet network, wherein the first Ethernet node and the second Ethernet node are collectively in an active-active interworking configuration therebetween; and a dummy node associated with the first Ethernet node; wherein the active-active interworking configuration includes using a same link number for the first protocol for the first Ethernet node and the second Ethernet node and using the dummy node to project an extra node in the second protocol enabling two paths in the second protocol. The first protocol can include Ethernet Virtual Private Network (E-VPN) and the second protocol can include Shortest Path Bridging Media Access Control (SPBM); wherein the same link number can include a same Ethernet Segment Identifier (ESI) such that, from the E-VPN perspective, the first Ethernet node and the second Ethernet node appear to support an SPBM network using a single link. From the E-VPN, a unicast packet can use whichever of the first Ethernet node and the second Ethernet node is closest to a traffic source associated with the unicast packet. From the SPBM network, the dummy node can advertise one or more service identifiers (I-SIDs) and bind them to their allocated ESI.

Each of the first Ethernet node and the second Ethernet node can include a Multiprotocol Label Switching edge switch (MES) to the E-VPN and a Backbone Core Bridge (BCB) to the SPB; and wherein the dummy node can include a Backbone Edge Bridge (BEB) to the SPBM network. The first Ethernet node can include a first Backbone Core Bridge (BCB) to the SPB, the second Ethernet node can include a second BCB to the SPB, and the dummy node can represent a dummy Backbone Edge Bridge (BEB) to the SPBM network; wherein the first BCB can advertise into Intermediate System To Intermediate System (IS-IS) SPB the dummy BEB and all its local ends of SPBM links along with handling service identifier (I-SID) to ESI bindings; and wherein the second BCB can advertise into IS-IS SPB its local ends of links connected to the dummy BEB along with knowing the I-SID to ESI bindings to enable correct local forwarding actions. At the second BCB, the second BCB can advertise links between the second BCB and the dummy node as if the dummy node were real. Responsive to a local link failure at the first BCB, the first BCB can advertise link down for the first BCB and the dummy BEB while continuing to proxy advertisements on behalf of the dummy BEB; and wherein, responsive to a local link failure at the second BCB, the second BCB can advertise link down for the second BCB while leaving the first BCB to act on behalf of the dummy BEB. The first Ethernet node can include a first Backbone Core Bridge (BCB) to the SPB, the second Ethernet node can include a second BCB to the SPBM network, and the dummy node can include a dummy Backbone Edge Bridge (BEB) to the SPBM network that appears as a dual-homed BEB that can be reached via the first BCB and the second BCB.

In another exemplary embodiment, an Ethernet method includes operating a first Ethernet node connected to both a first Ethernet network operating a first protocol and a second Ethernet network operating a second protocol; operating a second Ethernet node connected to both the first Ethernet network and the second Ethernet network, wherein the first Ethernet node and the second Ethernet node are collectively in an active-active interworking configuration therebetween; synthesizing a dummy node associated with the first Ethernet node to advertise an extra node in the second protocol enabling a path to the dummy node from both the first Ethernet node and the second Ethernet node in the second protocol; and using a same link number for the first protocol for the first Ethernet node and the second Ethernet node. The first protocol can include Ethernet Virtual Private Network (E-VPN) and the second protocol can include Shortest Path Bridging Media Access Control (SPBM); and wherein the same link number can include a same Ethernet Segment Identifier (ESI) such that, from the E-VPN perspective, the first Ethernet node and the second Ethernet node appear to support an SPBM network using a single link. The Ethernet method can further include receiving, from the E-VPN, a unicast packet at one of the first Ethernet node and the second Ethernet node based on which is closest to a traffic source associated with the unicast packet; and transmitting the unicast packet from the first network to the second network at the receiving node. The Ethernet method can further include advertising, from the SPBM network, a service identifier (I-SID) that is bound to the ESI.

Each of the first Ethernet node and the second Ethernet node can include a Multiprotocol Label Switching edge switch (MES) to the E-VPN and a Backbone Core Bridge (BCB) to the SPBM network; and wherein the dummy node can include a Backbone Edge Bridge (BEB) to the SPBM network. The first Ethernet node can include a first Backbone Core Bridge (BCB) to the SPB, the second Ethernet node can include a second BCB to the SPB, and the dummy node can represent a dummy Backbone Edge Bridge (BEB) to the SPB; and the method can further include advertising, by the first BCB, into Intermediate System To Intermediate System (IS-IS) SPB the dummy BEB and the local end of all its SPBM links along with handling service identifier (I-SID) to ESI bindings; and advertising, by the second BCB, into IS-IS SPB the local end of all of its links with the dummy BEB along with knowing the I-SID to ESI bindings to enable correct local forwarding actions. The Ethernet method can further include advertising a link between the second BCB and the dummy node as if the dummy node were real. The Ethernet method can further include advertising, by the first BCB, link down for the first BCB and the dummy BEB while continuing to proxy advertisements on behalf of the dummy BEB responsive to a local link failure at the first BCB; and advertising, by the second BCB, link down for the second BCB while leaving the first BCB to act on behalf of the dummy BEB responsive to a local link failure at the second BCB. The first Ethernet node can include a first Backbone Core Bridge (BCB) to the SPBM network, the second Ethernet node can include a second BCB to the SPBM network, and the dummy node can represent a dummy Backbone Edge Bridge (BEB) to the SPBM network that appears as a dual-homed BEB that can be reached via the first BCB and the second BCB.

In yet another exemplary embodiment, an Ethernet node includes a first port connected to a Shortest Path Bridging Media Access Control (SPBM) network; a second port connected to an Ethernet Virtual Private Network (E-VPN); and forwarding logic coupled to the first port and the second port for forwarding Ethernet packets therebetween; wherein the Ethernet node is configured in an active-active interworking configuration with a second Ethernet node connected to both the SPBM network and the E-VPN network; and wherein the active-active dual homed interworking configuration includes using a same Ethernet Segment Identifier (ESI) for the E-VPN network for a link to the Ethernet node and a link to the second Ethernet node and using a dummy node to represent an extra node in the SPBM network enabling a path to the dummy node from both the Ethernet node and the second Ethernet node in the SPBM network.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, active-active interworking systems and methods enable SPBM to interwork with E-VPN in a fully utilized and unblocked manner. Specifically, active-active interworking is the "holy grail" and extremely difficult in the Ethernet context. The systems and methods offer such techniques to allow SPBM to overlay E-VPN. For example, the systems and methods contemplate active-active interface operation without service awareness using both multiple links and multiple redundant nodes between networks using SPBM and E-VPN. That is, the systems and methods contemplate both a link- and node-diverse set of SPBM and E-VPN interfaces so that all links forming that interface are used for traffic carrying. The systems and methods overcome conventional techniques enforcing active-standby operation in some way at the Ethernet service level, for the avoidance of forwarding loops in the Ethernet domain thereby removing unused capacity under fault-free conditions.

Figure 1:
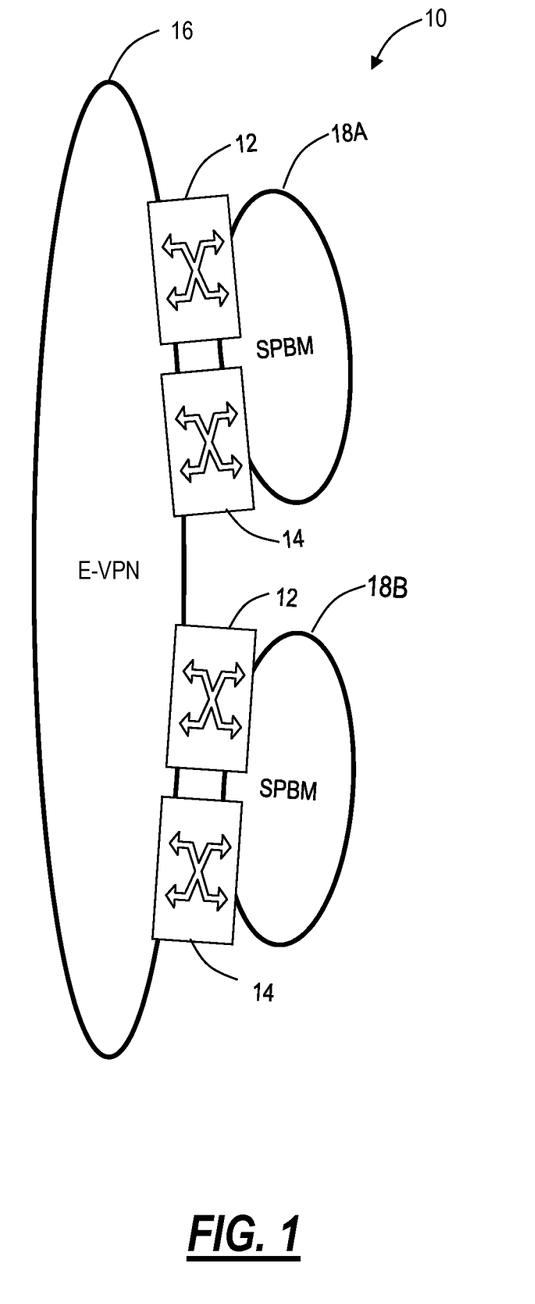
FIG. 1 is a network diagram of a network with dual-homed nodes between an E-VPN and an SPBM network.

Referring to FIG. 1, in an exemplary embodiment, a network diagram illustrates a network 10 with dual-homed nodes 12, 14 between an E-VPN 16 and SPBM networks 18A, 18B. The nodes 12, 14 can include switch elements and the like. Specifically, the nodes 12, 14 include inter alia ports for physically interconnecting to other nodes and switching devices for forwarding packets between the ports. In the various exemplary embodiments described herein, the nodes 12, 14 support E-VPN, SPBM, and the like. From the perspective of the E-VPN 16, each of the nodes 12, 14 is an MPLS edge switch (MES). From the perspective of the SPBM core networks 18A, 18B, each of the physical nodes 12, 14 is a Backbone Core Bridge (BCB). Variously, the network 10 includes an active-active unicast forwarding construct in SPBM, which will work with any number of SPBM-EVPN Gateways (note, FIG. 1 illustrates two gateways via the nodes 12, 14), to match the construct supported by E-VPN, so that the two mechanisms mesh perfectly.

In either the E-VPN 16 and the SPBM 18A, 18B, the fundamental structure is MAC-in-MAC traffic, i.e. a packet with Customer MAC (C-MAC) addresses encapsulated within an Ethernet service identifier (I-SID) to distinguish services, and further encapsulated within a Ethernet frame with B-MAC addresses to move the user traffic from edge to edge. One well-known constraint in Ethernet is loop avoidance and this makes dual-homing difficult in an Ethernet environment. The systems and methods described herein are more ambitious than simply dual homing, rather the systems and methods seek to interconnect the E-VPN 16 and the SPBM 18A, 18B between two or more bridges each while still using all of the links as active the whole the time. In an exemplary embodiment, each copy of a unicast packet is constrained to pass through only one of the nodes 12, 14 to avoid duplication. This is achieved as a natural consequence of the Shortest Path First (SPF) routing protocols operating in both E-VPN and SPBM domains, in that by making both the node 12 and the node 14 appear to offer alternate routes to any destination from either domain, the SPF protocol will select only the shortest. The treatment of multicast routing is deferred until later.

Figure 2:
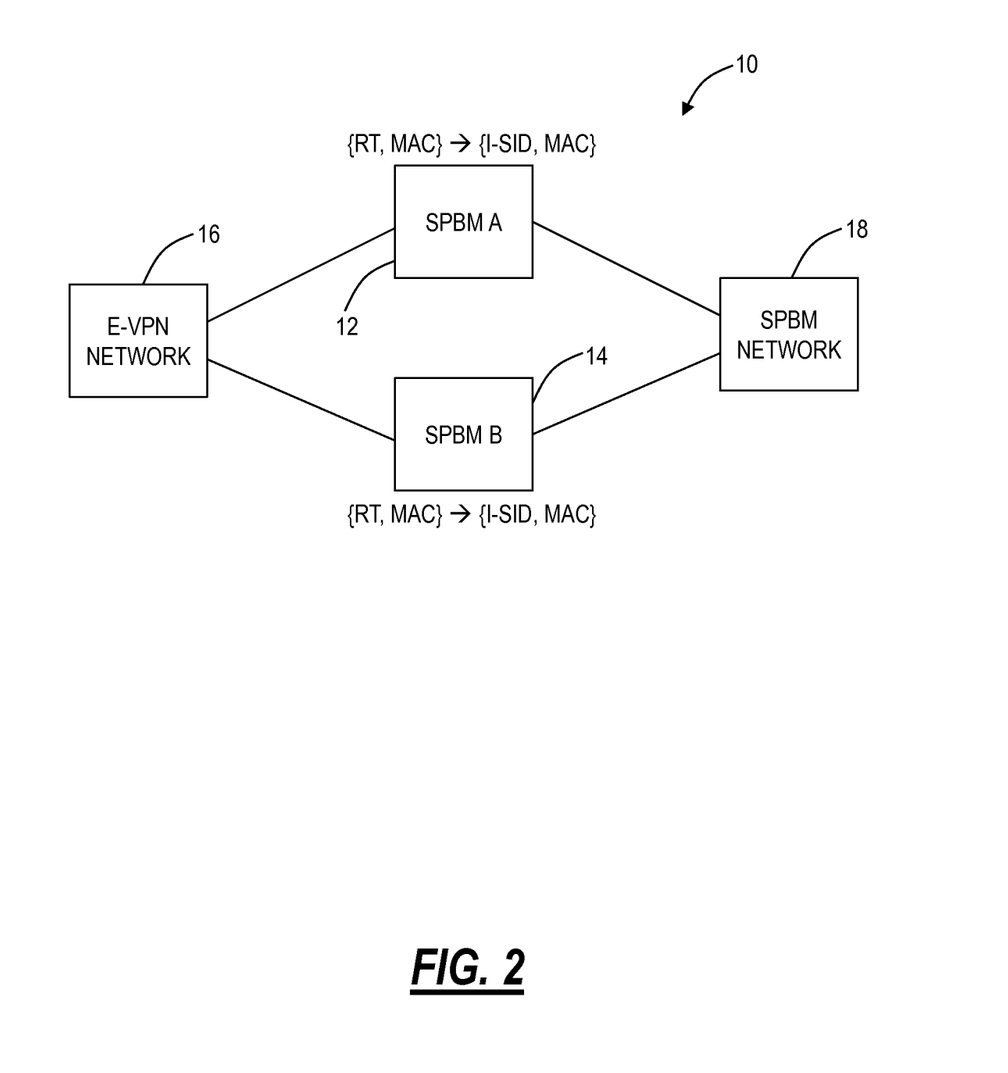
FIG. 2 is a network diagram of the network of FIG. 1 illustrating exploitation of advertisements.

In an exemplary embodiment, it is possible to exploit the advertisements of Backbone Media Access Control (B-MACs) within the E-VPN 16. When a SPBM node is also a E-VPN Gateway (as is the case with the nodes 12, 14), the nodes 12, 14 on SPBM network 18A will learn B-MACs on remote ESIs (Ethernet Segment Instances) interfacing to SPBM network 18B via the Border Gateway Protocol (BGP) running in E-VPN network 16, in the context of the RT (Route Target-VPN Identifier) to which they are bound. The ESIs here can represent an entire SPBM domain with SPBM overlaid on E-VPN and I-SIDs tunneled through the E-VPN. They are available to both gateways as shown in FIG. 2, and can be advertised into the SPBM 18 by an appropriate construct using Intermediate System To Intermediate System (IS-IS) for SPB. Then, when computing a (unicast) route, bridges seeing the same B-MAC as reachable from more than one Backbone Core Bridge (i.e., the nodes 12, 14 in the SPBM 18) that it is accessible from both points via E-VPN space, and choose shortest SPBM path to either SPBM-EVPN gateway. Bindings between individual remote Ethernet services and the B-MACs by which they may be reached are formed by advertising the remote service instances transparently as NLRI over E-VPN, as described in draft-allan-12vpn-spbm-evpn-01, and re-advertising them into the local SPBM domain in a SPBM Service Identifier and Unicast Address (ISID-ADDR) sub-TLV.

Figure 3:
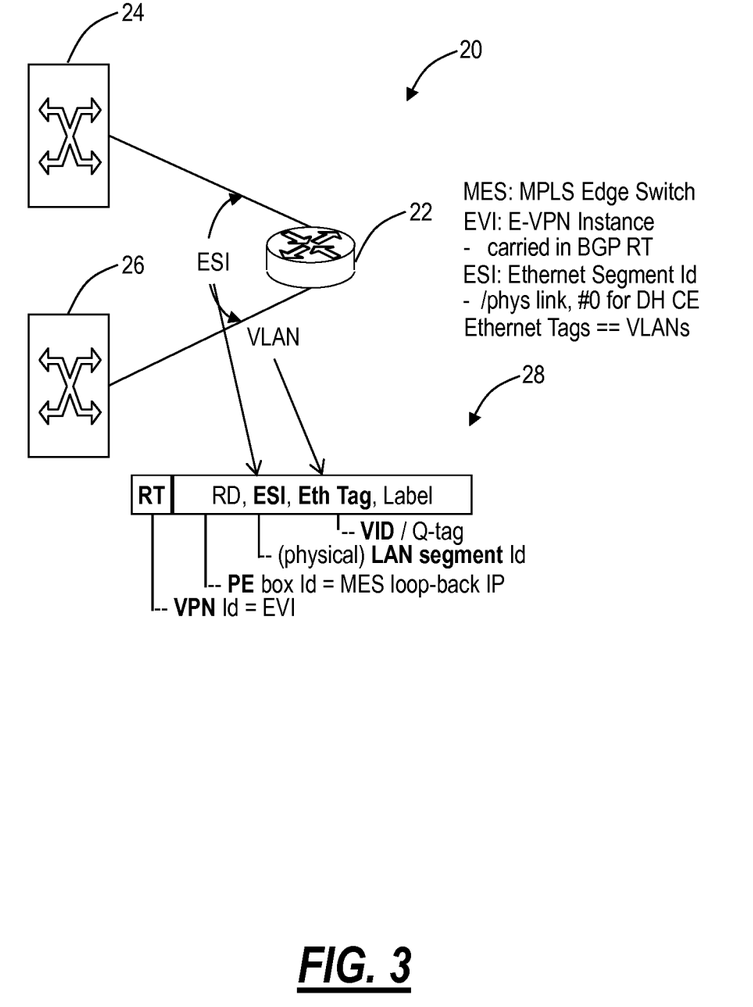
FIG. 3 is a network diagram of an E-VPN network with a CE connected to exemplary MESs that form the edge of the MPLS infrastructure.

Referring to FIG. 3, in an exemplary embodiment, a network diagram illustrates an E-VPN network 20 with a CE 22 connected to exemplary MESs 24, 26 that form the edge of the MPLS infrastructure. Note, the MESs 24, 26 can also be referred to as PEs. The MESs 24, 26 provide layer 2 virtual bridge connectivity between the CE 22 and other CEs. Note, although it is correct to call the CE 22 a "CE", because that is its E-VPN role, it is important to realize that it is carrying B-MACs, etc, because SPBM is overlaying E-VPN, i.e. SPBM is the client/customer of E-VPN. There may be multiple E-VPNs in the provider's network. An E-VPN routing and forwarding instance on the MES 24, 26 is referred to as an E-VPN Instance (EVI). The MESs 24, 26 may be connected by an MPLS label-switched path (LSP) infrastructure which provides the benefits of MPLS LSP technology such as fast re-route. The MESs 24, 26 may also be connected by an Internet Protocol (IP) infrastructure in which case Generic Routing Encapsulation (GRE) tunneling (i.e. GRE over IP) is used between the MESs 24, 26. The detailed procedures are specified only for MPLS LSPs as the tunneling technology. However they are designed to be extensible to GRE over IP as the tunneling technology.

In the E-VPN network 20, MAC learning between the MESs 24, 26 occurs not in the data plane (as happens with traditional bridging) but in the control plane. Control plane learning offers greater control over the MAC learning process, such as restricting who learns what, and the ability to apply policies. Furthermore, the control plane chosen for advertising MAC reachability information is multi-protocol (MP) Border Gateway Protocol (BGP) (very similar to IP VPNs (RFC 4364 entitled "BGP/MPLS IP Virtual Private Networks (VPNs)" (February, 2006)), providing greater scale, and the ability to preserve the "virtualization" or isolation of groups of interacting agents (hosts, servers, Virtual Machines) from each other. In the E-VPN network 20, the MESs 24, 26 advertise the MAC addresses learned from the CE 22 that is connected to them, along with an MPLS label, to other MESs in the control plane using BGP-MP. In the case of SPBM domains overlaying an E-VPN, as described in draft-ietf-12vpn-pbb-even-03, the MAC addresses are the B-MACs associated with SPBM BEBs, and they are not learned in the data path, but are learned via the SPBM control plane. Control plane learning enables load balancing of traffic to and from CEs that are multihomed to multiple MESs, such as the CE 22 multihomed to the MESs 24, 26. This is in addition to load balancing across the MPLS core via multiple LSPs between the same pair of MESs. In other words it allows CEs to connect to multiple active points of attachment. It also improves convergence times in the event of certain network failures.

In E-VPN, learning between the MESs 24, 26 and the CE 22 is done by the method best suited to CE 22, i.e. data plane learning, IEEE 802.1x, Link Layer Discovery Protocol (LLDP), IEEE 802.1aq, Address Resolution Protocol (ARP), management plane or other protocols. In this embodiment, E-VPN carries only B-MACs, and these are learned by the normal operation of the ISSI-SPB protocol, and passed into E-VPN by the SPBM-EVPN gateways 12, 14. The policy attributes of the E-VPN network 20 are very similar to those of an IP VPN. An E-VPN instance requires a Route-Distinguisher (RD) and an E-VPN requires one or more Route-Targets (RTs). The CE 22 attaches to an E-VPN instance (EVI) on the MES 24, 26, on an Ethernet interface which may be configured for one or more Ethernet Tags, e.g., VLANs. Some deployment scenarios guarantee uniqueness of VLANs across E-VPNs: all points of attachment of a given E-VPN use the same VLAN, and no other E-VPN uses this VLAN. This can be referred to as a "Unique Single VLAN E-VPN" with simplified procedures to optimize for it.

The E-VPN network 20 includes Border Gateway Protocol (BGP) E-VPN Network Layer Reachability Information (NLRI) 30 which includes a Route Target (RT), a Route Distinguisher (RD), an Ethernet Segment Identifier (ESI), an Ethernet Tag (Eth Tag), and a label. The BGP E-VPN NLRI 30 can be set for Ethernet Auto-Discovery (A-D) route, MAC advertisement route, and inclusive multicast route. The BGP E-VPN NLRI 30 can include ESI MPLS Label Extended Community—1+1 multi-homing. For the MAC advertisement route, the BGP E-VPN NLRI 30 allows MAC to be specified as a prefix and the labels are assigned in the E-VPN label stack (e.g., see section 4.3 in draft-allan-l2vpn-spbm-evpn-01). This can include a label for all MACs in EVI, per <ESI, Eth. Tag>, or per MAC.

Figure 4:
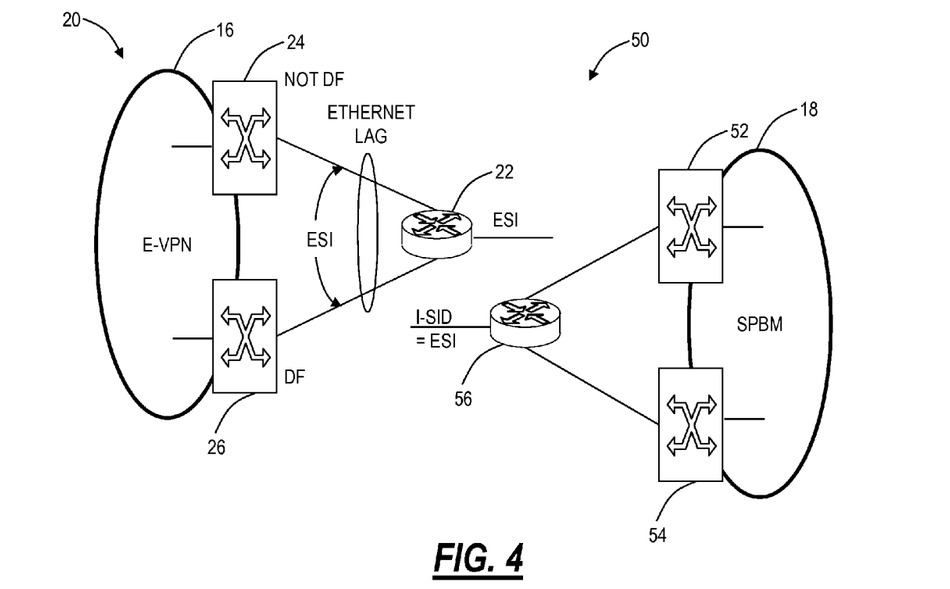
FIG. 4 is a network diagram of an E-VPN-SPBM interworking network with the E-VPN network and the SPBM network shown separately.
Figure 5:
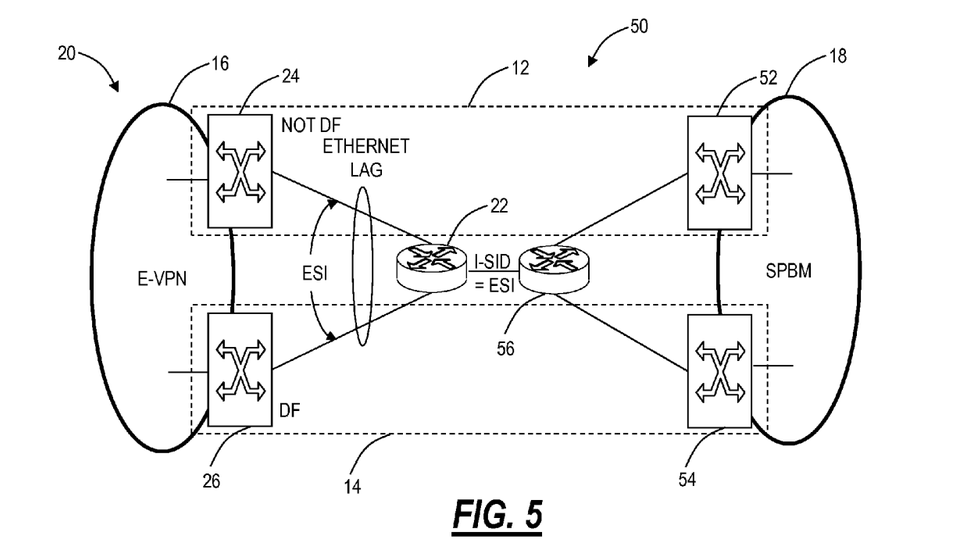
FIG. 5 is a network diagram of the E-VPN-SPBM interworking network of FIG. 4 with the E-VPN network and the SPBM network shown together in actual physical implementation.

Referring to FIGS. 4 and 5, in an exemplary embodiment, network diagrams illustrate an E-VPN-SPBM interworking network 50 with the E-VPN network 20 and an SPBM network 18. FIG. 4 illustrates the E-VPN network 20 separate from the SPBM network 18. In particular in FIG. 4, the E-VPN network 20 shows the E-VPN view of an active-active dual-homed Ethernet interface, i.e. the MESs 24, 26 see a common ESI. The SPBM network 18 shows the SPBM view of a dual-homed Backbone Edge Bridge (BEB) 56, with user services exposed to the control plane behind it, and reachable via two Backbone Core Bridges (BCBs) 52, 54. FIG. 5 illustrates a view of the same network 50 showing an actual physical embodiment where the MES 24 and the BCB 52 are physically part of the same node 12 and the MES 26 and the BCB 54 are physically part of the same node 14. The CE 22 and the BEB 56 are "dummy nodes" to provide a structure needed to emulate and deliver active-active E-VPN and SPBM interworking with nodal redundancy.

Actual connectivity between the MES 24 and the BCB 52 and between the MES 26 and the BCB 54 is internal to the nodes 12, 14. FIG. 5 illustrates the structure to synthesize which logically is an overlaid configuration from that of FIG. 4 with a logical link in the middle for a single service interworking point. The dotted lines in FIG. 5 show that the node 12 includes both the MES 24 and the BCB 52 and the node 14 includes both the MES 26 and the BCB 54. The systems and methods essentially synthesize the structure in the middle including the CE 22 and the BEB 56 as the dummy nodes for performing the active-active interworking.

As described herein, the E-VPN network 20 supports active-active dual homing to the CE 22. This can include use of the Ethernet Segment ID (ESI) which is a key concept in E-VPN. In E-VPN, the ESI is used for multi-homing the CE 22 to the MESs 24, 26, and traditionally would include unique identifiers for each of the multi-homed links. In an exemplary embodiment, the ESI is made identical for each of the nodes 12, 14 in order to invoke the multi-access segment semantics of draft-ietf-l2vpn-evpn-01. Here, in E-VPN, the two nodes 12, 14, on the same VPN with the same link number are then joined together such that a unicast packet will only deliver to one of the nodes 12, 14. This includes load balancing in that the closest node 12, 14 to the traffic source will convey the unicast packet. Thus, E-VPN supports active-active interworking.

However, it is not possible in SPBM to utilize the same technique as with E-VPN because SPBM has no corresponding construct of a link number within an individual service, i.e. the ESI. The service identifier (I-SID) in SPBM assumes every link is a different LAN segment. It is possible to synthesize an IS-IS structure for SPBM which models the "LAN Segment" semantics. IS-IS supports a structure, the Pseudo-Node, which models a LAN Segment (the "ESI" above). However, this is more general and carries more signaling and computation overhead than is necessary for this application, and also carries connotations of a multi-access segment rather than a bridged segment. The technique proposed here is instantiate a dummy node associated with one of the SPBM gateways 52, 54. The nodes 12, 14 must be configured as a dual-homed pair, and the choice of which of the nodes 12, 14 has the dummy node may be configured, or determined by an algorithm (e.g. the lowest IS-IS System ID). In this exemplary embodiment, the SPBM gateway 52 is assumed to have the dummy node.

Figure 6:
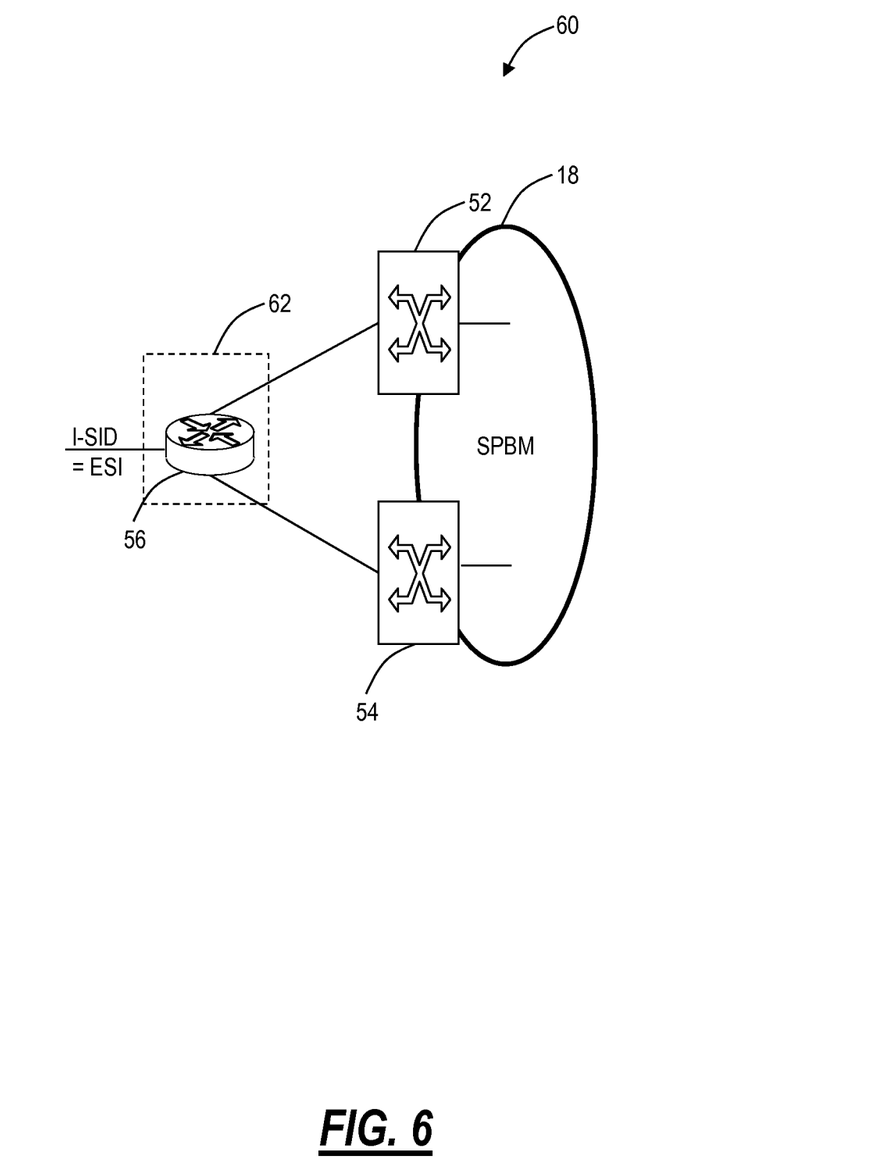
FIG. 6 is a network diagram of the SPBM network from the E-VPN-SPBM interworking network of FIGS. 4 and 5.

Referring to FIG. 6, in an exemplary embodiment, a network diagram illustrates a SPBM network 60 from the E-VPN-SPBM interworking network 50. The SPBM network 60 includes a dummy node 62 (with the network role of a BEB) which is physically implemented at the BCB 52 which is physically implemented at the node 12 of FIG. 5. While the gateway node 12 only includes the SPBM BCB 52 physically, from SPBM's perspective, there are two nodes, the BCB 52 and the dummy node 62. Dual-homed I-SIDs (those bound to the dual-attached ESIs of E-VPN) are configured to be associated with the dummy node. This is similar to an IS-IS Pseudo-Node, but in a different, E-VPN-specific, construct.

The node 12 generates all the IS-IS Link State Packets (LSPs) for the dummy node 62, and all SPBM nodes select the shortest path for forwarding. Hence the node 12, 14 actually used by a particular source is that topologically closer to the source, since both nodes 12, 14 are equidistant from the dummy node 62, and so "active-active" operation, irrespective of I-SID or VLAN assignment, results.

The computation load on the node 12 is not great, because the node 12 is by definition an IS-IS edge node and needs to compute a single Dijkstra only. The node 14, in the role of BCB 54, generates only the LSP for his end of the link to dummy node 62. This is important; the node 12 handles the dummy node 62 completely, to ensure LSP and sequence integrity, but failure of connectivity between node 14 and the E-VPN network 20 can only be detected and signaled by the node 14, and the matching withdraw (as from the dummy node 62) will be signaled by the node 12 when the matching link withdrawal from the node 14 is seen. If connectivity between the node 12 and the E-VPN network 20 fails, the node 12 announces a link failure on behalf of both himself and the dummy node 62, but continues to host the dummy node 62. If the node 12 itself fails, which is detected by normal IS-IS mechanisms, the node 14 has all the LSPs from dummy node 62 with up-to-date sequence numbers in his LSDB (Link State Database), and so the node 14 can pick up the task of hosting the dummy node 62 immediately that he is confident that node 12 has truly failed.

In FIG. 6, the BCB 52 is configured as master with respect to the dummy node 62. The BCB 52 advertises into ISIS-SPB the dummy BEB 56 and the local end of its links and so handles remote I-SID⇔B-MAC bindings received via E-VPN NLRI from remote SPBM domains (and hence their advertisement as from the dummy node 62). This is done according to the procedures described in draft-allan-l2vpn-spbm-evpn-01, whereby the I-SID within an E-VPN MAC advertisement route NRLI is only advertised into the local SPBM domain, as from the dummy node, if a local advertisement of the same I-SID has been received. The BCB 54 advertises into ISIS-SPBM only his local end of the link connecting to the dummy BEB node. In the reverse direction, both BCB 54 and BCB 52 advertise local I-SID⇔ B-MAC bindings as NLRI into E-VPN, in order to signify that the I-SID+B-MAC are reachable over the E-VPN ESI via either node. If the BCB's 52 local link fails, the BCB 52 advertises link down on behalf of himself and the dummy node 62, but continues to proxy other advertisements on behalf of the dummy node. If the BCB's 54 local link fails, the BCB 54 advertises link down on behalf of himself, but leaves the BCB 52 to act on this and advertise link down on behalf of the dummy node 62. If the BCB 52 fails, the BCB 54 must wait until all connectivity to the BCB 52 is seen down by ISIS-SPB before the BCB 54 may take over the role of proxy for the dummy node starting with the previously received LSPs in the BCB's 54 LSDB.

Stated differently, the BCB 52 (i.e., the node 12) carries its own instance of the IS-IS routing protocol plus a second instance of the IS-IS protocol representing the dummy node 62. This appears to the network 60 as a node in its own right and further because of the way the IS-IS protocol works, the dummy BEB 56/dummy node 62 sends messages to the BCB 52 and the BCB 52 floods them onwards unchanged. The BCB 56 mimics the behavior of the dummy BEB 56. The BCB 54 has little to do, the BCB 52 advertises the dummy node 62, and the one thing the BCB 54 has to do is to advertise the status of the local end of the links between him and dummy node 62 as if the dummy node 62 were real. In SPBM, now every node in the SPBM network can see a dual homed dummy BEB 56 that can be reached via the BCBs 52, 54.

The preceding paragraphs described unicast operation exclusively, being the dominant traffic class which will therefore benefit most from active-active operation. Both E-VPN and SPBM support Ethernet broadcast and flood operations, and these are supported across the interface. In the E-VPN to SPBM direction, the procedures of draft-allan-l2vpn-spbm-evpn-01 for the election of a Designated Forwarder for multicast traffic are followed, and this node becomes the root node for multicast tree construction in the SPBM domain for traffic entering from the E-VPN. In the SPBM to E-VPN direction, the normal SPB multicast tree construction procedures are followed, so that the advertisement of remote services instances by the dummy BEB 56 will result in a single physical node (either 52 or 54) being selected as the root of any specific multicast tree in the E-VPN network, the selected node being on the shortest path from the root node in the SPBM domain to the dummy BEB node.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Ethernet network, comprising:
  a first Ethernet node connected to both a first Ethernet network operating a first protocol and a second Ethernet network operating a second protocol;
  a second Ethernet node connected to both the first Ethernet network and the second Ethernet network, wherein the first Ethernet node and the second Ethernet node are collectively in an active-active interworking configuration therebetween; and
  a dummy node associated with the first Ethernet node to represent connectivity to the first Ethernet network within the second protocol;
  wherein the active-active interworking configuration comprises using a same link number for the first protocol for the first Ethernet node and the second Ethernet node and using the dummy node to advertise an extra node in the second protocol enabling two paths in the second protocol;
  wherein the first protocol comprises Ethernet Virtual Private Network (E-VPN) and the second protocol comprises Shortest Path Bridging Media Access Control (SPBM); and
  wherein the same link number comprises a same Ethernet Segment Identifier (ESI) such that, from the E-VPN perspective, the first Ethernet node and the second Ethernet node appear to support an SPBM network using a single link.

2. The Ethernet network of claim 1, wherein, from the E-VPN, a unicast packet uses whichever of the first Ethernet node and the second Ethernet node is closest to a traffic source associated with the unicast packet.

3. The Ethernet network of claim 1, wherein, from the SPBM network, the dummy node advertises a service identifier (I-SID) and bounds it to the ESI.

4. The Ethernet network of claim 1, wherein each of the first Ethernet node and the second Ethernet node comprise a Multiprotocol Label Switching edge switch (MES) to the E-VPN and a Backbone Core Bridge (BCB) to the SPB; and
  wherein the dummy node is advertised as a Backbone Edge Bridge (BEB) to the SPBM network.

5. The Ethernet network of claim 1, wherein the first Ethernet node comprises a first Backbone Core Bridge (BCB) to the SPB, the second Ethernet node comprises a second BCB to the SPB, and the dummy node comprises a dummy Backbone Edge Bridge (BEB) to the SPBM network;
wherein the first BCB advertises into Intermediate System To Intermediate System (IS-IS) SPB the dummy BEB and the local end of all of its SPBM links along with handling service identifier (I-SID) to ESI bindings; and
wherein the second BCB advertises into IS-IS SPB the local end of its links associated with the dummy BEB along with knowing the I-SID to ESI bindings to enable correct local forwarding actions.

6. The Ethernet network of claim 5, wherein, at the second BCB, the second BCB advertises the local end of links between the second BCB and the dummy node as if the dummy node were real.

7. The Ethernet network of claim 5, wherein, responsive to a local link failure at the first BCB, the first BCB advertises link down for the first BCB and the dummy BEB while continuing to proxy advertisements on behalf of the dummy BEB;
wherein, responsive to a local link failure at the second BCB, the second BCB advertises link down for the second BCB while leaving the first BCB to act on behalf of the dummy BEB.

8. The Ethernet network of claim 1, wherein the first Ethernet node comprises a first Backbone Core Bridge (BCB) to the SPB, the second Ethernet node comprises a second BCB to the SPBM network, and the dummy node comprises a dummy Backbone Edge Bridge (BEB) to the SPBM network that appears as a dual-homed BEB that can be reached via the first BCB and the second BCB.

9. An Ethernet method, comprising:
operating a first Ethernet node connected to both a first Ethernet network operating a first protocol and a second Ethernet network operating a second protocol;
operating a second Ethernet node connected to both the first Ethernet network and the second Ethernet network, wherein the first Ethernet node and the second Ethernet node are collectively in an active-active interworking configuration therebetween;
synthesizing a dummy node associated with the first Ethernet node to advertise an extra node representing connectivity to the first Ethernet network in the second protocol enabling a path to the dummy node from both the first Ethernet node and the second Ethernet node in the second protocol; and
using a same link number for the first protocol for the first Ethernet node and the second Ethernet node;
wherein the first protocol comprises Ethernet Virtual Private Network (E-VPN) and the second protocol comprises Shortest Path Bridging Media Access Control (SPBM); and
wherein the same link number comprises a same Ethernet Segment Identifier (ESI) such that, from the E-VPN perspective, the first Ethernet node and the second Ethernet node appear to support an SPBM network using a single link.

10. The Ethernet method of claim 9, further comprising:
receiving, from the E-VPN, a unicast packet at one of the first Ethernet node and the second Ethernet node based on which is closest to a traffic source associated with the unicast packet; and
transmitting the unicast packet from the first network to the second network at the receiving node.

11. The Ethernet method of claim 9, further comprising:
advertising, from the SPBM network, a service identifier (I-SID) that is bound to the ESI.

12. The Ethernet method of claim 9, wherein each of the first Ethernet node and the second Ethernet node comprise a Multiprotocol Label Switching edge switch (MES) to the E-VPN and a Backbone Core Bridge (BCB) to the SPBM network; and
wherein the dummy node comprises a Backbone Edge Bridge (BEB) to the SPBM network.

13. The Ethernet method of claim 9, wherein the first Ethernet node comprises a first Backbone Core Bridge (BCB) to the SPB, the second Ethernet node comprises a second BCB to the SPB, and the dummy node comprises a dummy Backbone Edge Bridge (BEB) to the SPB; and further comprising:
advertising, by the first BCB, into Intermediate System To Intermediate System (IS-IS) SPB the dummy BEB and the local end of all of its SPBM links along with handling service identifier (I-SID) to ESI bindings; and
advertising, by the second BCB, into IS-IS SPB the local end of its links associated with the dummy BEB along with knowing the I-SID to ESI bindings to enable correct local forwarding actions.

14. The Ethernet method of claim 13, further comprising:
advertising a link between the second BCB and the dummy node as if the dummy node were real.

15. The Ethernet method of claim 13, further comprising:
advertising, by the first BCB, link down for the first BCB and the dummy BEB while continuing to proxy advertisements on behalf of the dummy BEB responsive to a local link failure at the first BCB; and
advertising, by the second BCB, link down for the second BCB while leaving the first BCB to act on behalf of the dummy BEB responsive to a local link failure at the second BCB.

16. The Ethernet method of claim 9, wherein the first Ethernet node comprises a first Backbone Core Bridge (BCB) to the SPBM network, the second Ethernet node comprises a second BCB to the SPBM network, and the dummy node comprises a dummy Backbone Edge Bridge (BEB) to the SPBM network that appears as a dual-homed BEB that can be reached via the first BCB and the second BCB.

17. An Ethernet node, comprising:
a first port connected to a Shortest Path Bridging Media Access Control (SPBM) network;
a second port connected to an Ethernet Virtual Private Network (E-VPN); and
forwarding logic coupled to the first port and the second port for forwarding Ethernet packets therebetween;
wherein the Ethernet node is configured in an active-active interworking configuration with a second Ethernet node connected to both the SPBM network and the E-VPN network; and
wherein the active-active interworking configuration comprises using a same Ethernet Segment Identifier (ESI) for the E-VPN network for a link to the Ethernet node and a link to the second Ethernet node and using a dummy node to advertise an extra node in the SPBM network to represent connectivity to the E-VPN and enabling a path to the dummy node from both the Ethernet node and the second Ethernet node in the SPBM network.

* * * * *